(12) United States Patent
Keith et al.

(10) Patent No.: US 9,095,813 B2
(45) Date of Patent: Aug. 4, 2015

(54) CARBON DIOXIDE CAPTURE METHOD AND FACILITY

(75) Inventors: David Keith, Calgary (CA); Maryam Mahmoudkhani, Calgary (CA); Alessandro Biglioli, Calgary (CA); Brandon Hart, Okotoks (CA); Kenton Heidel, Calgary (CA); Mike Foniok, Calgary (CA)

(73) Assignee: Carbon Engineering Limited Partnership, Calgary, AB (CA)

( * ) Notice: Subject to any disclaimer, the term of this patent is extended or adjusted under 35 U.S.C. 154(b) by 0 days.

(21) Appl. No.: 12/545,579

(22) Filed: Aug. 21, 2009

(65) Prior Publication Data

US 2010/0064890 A1 Mar. 18, 2010

Related U.S. Application Data

(60) Provisional application No. 61/090,867, filed on Aug. 21, 2008.

(51) Int. Cl.
*B01D 47/14* (2006.01)
*B01D 53/18* (2006.01)
*B01D 53/77* (2006.01)

(52) U.S. Cl.
CPC ............... *B01D 53/18* (2013.01); *B01D 53/77* (2013.01); *B01D 2251/304* (2013.01);
(Continued)

(58) Field of Classification Search
CPC .. B01D 53/18; B01D 53/77; B01D 2251/304; B01D 2251/306; B01D 2251/604; Y02C 10/04; Y02C 10/08
USPC .............. 95/149–240; 96/234–233, 243–371; 261/19–74
See application file for complete search history.

(56) References Cited

U.S. PATENT DOCUMENTS 4,200,264 A    12/1976   Nagano et al.
4,049,399 A *   9/1977   Teller ................................. 95/36
(Continued)

FOREIGN PATENT DOCUMENTS

CN       101091864 A    12/2007
CN       101128248 A     2/2008
(Continued)

OTHER PUBLICATIONS

Joshuah K. Stolaroff, David W. Keith and Gregory V. Lowry, "Carbon Dioxide Capture from Atmospheric Air Using Sodium Hydroxide Spray," Mar. 6, 2008, Environmental Science and Technology, 2008, 42(8), pp. 2728-2735.*

(Continued)

*Primary Examiner* — Thomas McKenzie
(74) *Attorney, Agent, or Firm* — Fish & Richardson P.C.

(57) ABSTRACT

A carbon dioxide capture facility is disclosed comprising packing formed as a slab, and at least one liquid source. The slab has opposed dominant faces, the opposed dominant faces being at least partially wind penetrable to allow wind to flow through the packing. The at least one liquid source is oriented to direct carbon dioxide absorbent liquid into the packing to flow through the slab. The slab is disposed in a wind flow that has a non-zero incident angle with one of the opposed dominant faces. A method of carbon dioxide capture is also disclosed. Carbon dioxide absorbing liquid is applied into packing in a series of pulses. A gas containing carbon dioxide is flowed through the packing to at least partially absorb the carbon dioxide from the gas into the carbon dioxide absorbing liquid.

18 Claims, 8 Drawing Sheets

(52) U.S. Cl.
CPC .... *B01D 2251/306* (2013.01); *B01D 2251/604* (2013.01); *B01D 2257/504* (2013.01); *Y02C 10/04* (2013.01); *Y02C 10/08* (2013.01)

(56) References Cited

U.S. PATENT DOCUMENTS

| | | | |
|---|---|---|---|
| 4,183,901 A | | 1/1980 | Llardi et al. |
| 4,251,494 A | | 2/1981 | Say |
| 4,344,650 A | | 8/1982 | Pinsky et al. |
| 4,401,635 A | | 8/1983 | Frint |
| 4,632,760 A | | 12/1986 | Hanson et al. |
| 5,283,054 A | | 2/1994 | Copenhafer et al. |
| 5,364,604 A | * | 11/1994 | Spink et al. ................. 423/210 |
| 5,582,683 A | | 12/1996 | Bonsu et al. |
| 5,679,131 A | | 10/1997 | Obushenko |
| 5,695,548 A | * | 12/1997 | Trutna ............................ 95/216 |
| 5,879,434 A | * | 3/1999 | Kiss ................................ 95/199 |
| 6,428,759 B1 | | 8/2002 | Smith et al. |
| 6,582,498 B1 | * | 6/2003 | Sass et al. ....................... 95/211 |
| 6,840,987 B1 | * | 1/2005 | Gonzalez et al. .............. 96/274 |
| 7,214,290 B2 | | 5/2007 | Duesel, Jr. et al. |
| 7,297,182 B2 | * | 11/2007 | Ray et al. ......................... 95/64 |
| 7,314,847 B1 | | 1/2008 | Siriwardane |
| 7,318,857 B2 | * | 1/2008 | Ray et al. ......................... 96/44 |
| 7,329,298 B1 | * | 2/2008 | Hasinski ..................... 55/385.3 |
| 7,731,781 B2 | * | 6/2010 | Berry et al. ..................... 95/116 |
| 7,833,010 B2 | * | 11/2010 | Baker et al. ..................... 431/50 |
| 7,906,089 B2 | * | 3/2011 | Ghosh et al. ................. 423/210 |
| 8,574,354 B2 | * | 11/2013 | Keith et al. ..................... 96/296 |
| 2004/0094037 A1 | * | 5/2004 | Maleeny et al. ................ 95/285 |
| 2006/0000196 A1 | * | 1/2006 | Beier et al. ..................... 55/497 |
| 2006/0051274 A1 | * | 3/2006 | Wright et al. ................. 423/210 |
| 2006/0186562 A1 | * | 8/2006 | Wright et al. ................... 261/94 |
| 2007/0157806 A1 | * | 7/2007 | Cash et al. ...................... 95/174 |
| 2008/0011161 A1 | | 1/2008 | Finkenrath et al. |
| 2008/0031801 A1 | | 2/2008 | Lackner et al. |
| 2010/0034724 A1 | | 2/2010 | Keith et al. |

FOREIGN PATENT DOCUMENTS

| | | |
|---|---|---|
| WO | 2006/009600 | 1/2006 |
| WO | WO2006034339 A1 | 3/2006 |
| WO | WO2006084008 | 8/2006 |
| WO | 2007/075399 | 7/2007 |
| WO | WO 2007/075399 | 7/2007 |
| WO | WO 2008/042919 | 4/2008 |

OTHER PUBLICATIONS

Stolaroff et al., "Carbon dioxide capture from atmospheric air using sodium hydroxide spray,"Environ. Sci. Technol., 2008 42:2728-2735.
International Search Report and Written Opinion of the International Searching Authority, PCT Application Serial No. PCT/US2009/0054626, Apr. 5, 2010, 11 pp.
International Preliminary Report on Patentability and Written Opinion of the International Searching Authority from International Application No. PCT/US2009/054626, mailed Feb. 22, 2011, 6 pages.
Authorized officer Dorothée Müllhausen, International Preliminary Report on Patentability in PCT/GB2007/050762 mailed Jul. 2, 2009, 7 pages.
Baciocchi et al., "Process design and energy requirement for the capture of carbon dioxide from air," *Chem. Eng. Proc.*, 2006, 45:1047-1058.
Canadell et al., "Contributions to accelerating atmospheric $CO_2$ growth from economic activity, carbon intensity, and efficiency of natural sinks," *Proc. Natl. Acad. Sci. USA*, 2007, 104(47):18866-18870.
Chen and van Heiningen, "Kinetics of the direct causticizing reaction between sodium carbonate and titanium dioxide or sodium tri-titan­ate," *J. Pulp Paper Sci.*, 2006, 32(4):245-251.

Covey, "Development of the direct alkali recovery system and poten­tial application," *Pulp Pap. Canada*, 1982, 83(12):T350-T354.
Hoddenbagh et al., "Borate causticizing: a cost effective technology," *Pulp Pap. Canada*, 2002, 103(11):T283-T289.
International Preliminary Report on Patentability and Written Opin­ion of the International Searching Authority from International Application No. PCT/US2009/047999, mailed Dec. 21, 2010, 6 pages.
Kiiskilä, "Recovery of sodium hydroxide from alkaline pulping liquors by smelt causticizing, Part II. Recations between sodium carbonate and titanium dioxide," *Paperi ja Puu, Paper och Trä*, 1979, 5:394-401.
Kiiskilä, "Recovery of sodium hydroxide from alkaline pulping liquors by smelt causticizine, Pat III. Alkali distribution in titanium dioxide causticizing," *Paperi ja Puu, Papper och Trü*, 1979, 6:453-464.
Lackner et al., "Carbon dioxide from air," $24^{th}$ *Annual Technical Conference on Coal Utilization*, 1999, Clearwater, FL, 12 pages.
Maddern, "Mill-scale development of the DARS direct causticization process," Pulp Pap. Candada, 1986, 87(10):T395-T399.
Mahmoudkhani et al. "Low energy packed tower and caustic recov­ery for direct capture of CO2 from air," Energy Procedia, 2009, 1:1535-1542.
Mahmoudkhani and Keith, "Low-energy sodium hydroxide recovery for $CO_2$ capture from atmospheric air-Thermodynamic analysis," *Int. J. Greenhouse Gas Control*, 2009, 3:376-384.
Nohlgren, "Recovery of kraft black liquor with direct causticization using titanates," Ph.D. Thesis, Lulea University of Technology, Lulea, Sweden, 2002, 164 pages.
Palm and Theliander, "Kinetic study of the direct causticization reac­tion involving titanates and titanium dioxide," *Chem. Eng. J.*, 1997, 68:87-94.
Sinquefield et al., "Borate auto-causticization for low and high tem­perature black liquor gasification," *International Chemical Recovery Conference*, Jun. 6-10, 2004, Charleston, SC, 6 pages.
Spector and Dodge, "Removal of carbon dioxide from atmospheric air," *Trans. Am. Inst. Chem. Eng.*, 1946, 42:827-848.
Tepe and Dodge, "Absorption of carbon dioxide by sodium hydrox­ide solutions in a packed column," *Trans. Am. Inst. Chem. Eng.*, 1943, 39:255-276.
Yusuf and Cameron, "Decarbonization reactions between sodium metaborate and sodium carbonate,"*Ind. Eng. Chem. Res.*, 2004, 43:8148-8154.
Zeman, "Direct Extraction of CO2 from Air, a Fixed Solution for a Mobile Problem," *The First Regional Symposium on Carbon Mangagement*, May 23, 2006, Dhahran, Saudi Arabia, 12 pages.
Zeman, "Energy and material balance of $CO_2$ capture from ambient air," *Environ. Sci. Technol.*, 2007, 41(21):7558-7563.
Zeman and Lackner, "Capturing carbon dioxide directly from the atmosphere," *World Resource Review*, 2004, 16(2):157-172.
Zeng and van Heiningen, "Pilot fluidized-bed testing of kraft black liquor gasification and its direct causticization with $TiO_2$," *J. Pulp Paper Sci.*, 1997, 23(11):J511-J516.
Zou, "Recovery of kraft black liquor including direct causticization," Ph.D. Thesis, McGill University, Montreal, Quebec, 1991, 231 pages.
Magnus Palm et al., "Kinetic study of the direct causticization reac­tion involving titanates and titanium dioxide," Chemical Engineering Journal. 1997, vol. 68, pp. 87-94.
Le Zeng et al., "A Mathematic Model for Direct Causticization of Na2C03 with Ti02 in a Semi-batch Reactor," The Canadian Journal of Chemical Engineering, Oct. 2002, vol. 80, pp. 948-953.
Ingrid Nohlgren et al., "Model study of the direct causticization reaction between sodium trititanate and sodium carbonate," The Canadian Journal of Chemical Engineering, Jun. 2000, vol. 78, pp. 529-539.
International Search Report and Written Opinion of the International Searching Authority, PCT Application Serial No. PCT/US2009/047999, Jan. 29, 2010, 11 pp.
Supplementary European Search Report, Application No. 09808878. 4, dated Oct. 25, 2012, 4 pages.
European Office Action; Dec. 20, 2012; European Patent Office (EPO); 09808878.4.
Chinese First Office Action, Application No. 200980137997.2, issued Jan. 28, 2013, 13 pages.

(56) References Cited

OTHER PUBLICATIONS

Chinese Second Office Action, Application No. 200980137997.2, issued Aug. 26, 2013, 24 pages.

Chinese Decision on Rejection, Application No. 200980137997.2, issued Mar. 12, 2014, 19 pages.

European Search Report, Application No. 09767848.6, dated Feb. 17, 2012, 7 pages.

* cited by examiner

CARBON DIOXIDE CAPTURE METHOD AND FACILITY

This application claims priority to U.S. Provisional Application Ser. No. 61/090,867, filed on Aug. 21, 2008, which is incorporated by reference in its entirety herein.

TECHNICAL FIELD

This document relates to gas-liquid contact systems and methods, including carbon dioxide capture systems and methods for the recovery of $CO_2$ from atmospheric air.

BACKGROUND

To avoid dangerous climate change, the growth of atmospheric concentrations of carbon dioxide must be halted, and may have to be reduced. The concentration of carbon dioxide, the most important greenhouse gas, has increased from about 280 ppm in the preindustrial age to more than 385 ppm and it is now increasing by more than 2 ppm per year driven by global $CO_2$ emissions that are now increasing at more than 3.3% per year (Canadell et al., 2007).

Carbon capture and storage (CCS) technologies target $CO_2$ removal from large fixed-point sources such as power plants. Dispersed sources, however, emit more than half of global CO2 emissions. Direct capture of CO2 from ambient air, "air capture", is one of the few methods capable of systematically managing dispersed emissions. Therefore, while air capture is more expensive that capture from large point sources it remains important as it will primarily compete with emission reductions from dispersed sources such as transportation which can be very expensive to mitigate.

1.1 Air Capture

Carbon dioxide absorption from atmospheric air using alkaline solution has been explored for half a century (Spector and Dodge 1946, Tepe and Dodge 1943). Large scale scrubbing of CO2 from ambient air was first suggested by Lackner in the late 1990's (Lackner et al., 1999). In wet scrubbing techniques, CO2 is absorbed into a solution of sodium hydroxide, NaOH, and is leaving behind an aqueous solution of sodium hydroxide and sodium carbonate, Na2CO3. For this process, the contactor, as the component of the system that provides the contacts between CO2 and sodium hydroxide, has thus far been a point of contention. Large convective tower (Lackner et al., 1999), and packed scrubbing towers (Baciocchi et al., 2006 and Zeman, 2007) are the most commonly suggested contactor designs. A packed tower equipped with Sulzer Mellapak has been proposed by Baciocchi et al. (2006) to absorb CO2 from air with an inlet concentration of 500 ppm to an outlet concentration of 250 ppm using a 2M NaOH solution.

An alternative strategy, suggested by Stolaroff et al. (2007), is to generate a fine spray of the absorbing solution for providing large surface to the air flow through an open tower. This strategy could have the potential to operate with a small pressure drop in air and avoids the capital cost of packing material. Stolaroff et al. (2007) studied the feasibility of a NaOH spray-based contactor by estimating the cost and energy requirement per unit CO2 captured. Water loss, as a major concern in this design, was addressed and it was found that the water loss could be managed by adjusting the NaOH concentration with temperature and humidity of air, i.e. the higher the concentration of sodium hydroxide, the lower is the water loss, e.g. using ~7.2M NaOH, at 15° C. and 65% relative humidity, water loss is eliminated.

Conventional scrubbing towers may be filled with structured packing, and a flow of gas that is counter-current to the drainage of liquid through the structured packing is employed.

SUMMARY

A carbon dioxide capture facility is disclosed comprising packing formed as a slab, and at least one liquid source. The slab has opposed dominant faces, the opposed dominant faces being at least partially wind penetrable to allow wind to flow through the packing. The at least one liquid source is oriented to direct carbon dioxide absorbent liquid into the packing to flow through the slab. The slab is disposed in a wind flow that has a nonzero incident angle with one of the opposed dominant faces.

A method of carbon dioxide capture is also disclosed. Carbon dioxide absorbing liquid is applied into packing in a series of pulses. A gas containing carbon dioxide is flowed through the packing to at least partially absorb the carbon dioxide from the gas into the carbon dioxide absorbing liquid. The gas may flow continuously, even while the liquid flows intermittently. In some embodiments, the liquid and gas flow in a cross-flow geometry relative to one another. For purposes of this disclosure "cross-flow" means that the direction of the flow of gas relative to the direction of the flow of liquid is orthogonal or perpendicular.

A method of carbon dioxide capture is also disclosed. Carbon dioxide absorbing liquid is flowed through packing in a mean liquid flow direction. A gas containing carbon dioxide is flowed through the packing obliquely or perpendicularly to the mean liquid flow direction to at least partially absorb the carbon dioxide from the gas into the carbon dioxide absorbing liquid.

A method of contacting a liquid with a gas is also disclosed. The liquid is applied into packing in a series of pulses, and the gas is flowed through the packing.

A method of contacting a liquid with a gas is also disclosed. The liquid is flowed through packing in a mean liquid flow direction. The gas is flowed through the packing obliquely or perpendicularly to the mean liquid flow direction.

A gas-liquid contactor is also disclosed, comprising packing, and at least one liquid source. The packing is formed as a slab, the slab having opposed dominant faces, the opposed dominant faces being at least partially wind penetrable to allow wind to flow through the packing. The at least one liquid source is oriented to direct the liquid into the packing to flow through the slab. The slab is disposed in a wind flow that has a non-zero incident angle with one of the opposed dominant faces.

A gas-liquid contactor is also disclosed comprising a slab structure and a liquid source. The slab structure comprises packing. The liquid source is oriented to direct the liquid into the packing to flow in a mean liquid flow direction. The slab structure is disposed in a wind flow that flows obliquely or perpendicularly to the mean liquid flow direction.

A method of contacting a liquid with a moving gas is also disclosed. The liquid is flowed through packing, and the moving gas is driven through the packing in a drive direction that is at least partially oriented with an ambient flow direction of the moving gas.

The details of one or more non-limiting embodiments of the invention, which may be encompassed by the claims, are set forth in the drawings and the description below. Other embodiments of the invention should be apparent to those of ordinary skill in the art after consideration of the present disclosure. For example, although this disclosure relates in particular to the removal of carbon from ambient air, the methods and products described herein can be readily adapated for removing other components, such as for example $SO_x$, $NO_x$ and fluorinated compounds, from ambient air. A person of ordinary skill reading this specification would understand what, if any, modification should be made in order to capture the other components, for example in the choice of the liquid source.

BRIEF DESCRIPTION OF THE FIGURES

Embodiments will now be described with reference to the figures, in which like reference characters denote like elements, by way of example, and in which.

DETAILED DESCRIPTION

U.S. 61/074,458 and the related U.S. Ser. No. 12/488,230 and PCT PCT/US2009/047999 are hereby incorporated in its entirety by reference.

The disclosure provides methods for removing carbon and/or other components of air from ambient air, and devices for removing ambient $CO_2$ and/or other components of air from ambient air.

In some embodiments, the method involves directing ambient air using at least the energy of the wind, one or more fans, or both through a contactor comprising a packing material; intermittently flowing a carbon dioxide absorbing fluid over the packing to achieve an average flow rate; and, capturing $CO_2$ from the ambient air in the liquid such that either the carbon dioxide capture rate is increased relative to a similar method in which the liquid is constantly flowed at the average flow rate, or the effectiveness of cleaning the surface of the packing material is improved relative to a similar method in which the liquid is constantly flowed at the average flow rate, or both. "Intermittantly flowing" means flowing a fluid at a first rate that is higher than at least one second rate (i.e. verying the flow of the fluid through the contactor) resulting in an average flow rate, wherein the at least one second rate can be zero. In some such embodiments, the at least one second rate is zero, and intermittently flowing produces a series of pulses.

In some embodiments, the method involves intermittently flowing of a high molarity fluid through a contactor, and flowing ambient air through the contactor, thereby capturing $CO_2$ from the ambient air. In some embodiments, the method involves intermittently flowing a high molarity fluid through a contactor in a cross-flow geometry relative to the direction of the flow of ambient air, thereby capturing $CO_2$ from the air. In some embodiments, the method involves intermittently flowing a high molarity fluid through a contactor in direction that is substantially perpendicular to the direction of flow of ambient air, thereby capturing $CO_2$ from the air. In some embodiments mentioned in this paragraph, "intermittently flowing" can be implemented as pulsing the fluid through the contactor (over the packing material). For example, repeatedly switching between flowing the fluid briefly at a very high rate to evenly coat the packing material and shutting off the fluid flow for a duration of time.

In some embodiments, the device is a carbon (or other ambient air component) capture facility including at least one liquid having a capacity to absorb carbon dioxide (or other ambient air component); at least one packing material having a hold up relative to the liquid; and, at least one pump for flowing the liquid over the packing material, the pump being configured to deliberately vary the flow rate to produce an average flow rate, wherein the capacity of the liquid and the holdup of the packing material are chosen to either cooperatively achieve an increased carbon dioxide capture rate relative to a similar carbon dioxide capture facility in which the pump is operated constantly at the average flow rate, or to improve the effectiveness of cleaning of the surface of the packing material relative to a similar carbon dioxide capture facility in which the pump is operated constantly at the average flow rate, or both.

In some embodiments the carbon capture facility comprises a packing material having sufficient hold up that it can be intermittently wetted with a $CO_2$ (or other ambient air component) capture solution, and the capture facility has a vertical slab geometry. In some embodiments, the capture facility comprises a packing material capable of being intermittently wetted and used in a cross-flow geometry, and the capture facility has a vertical slab geometry. In some embodiments, the capture facility comprises a packing material capable of being intermittently wetted and used in a substantially perpendicular geometry, and the capture facility has a vertical slab geometry. In some embodiments, the capture facility further comprises a device for removing dust contamination, for example structural stilts which can lift the capture facility off the ground, for example at least about 5 m off of the ground so that dust blows underneath the facility.

Figure 1:
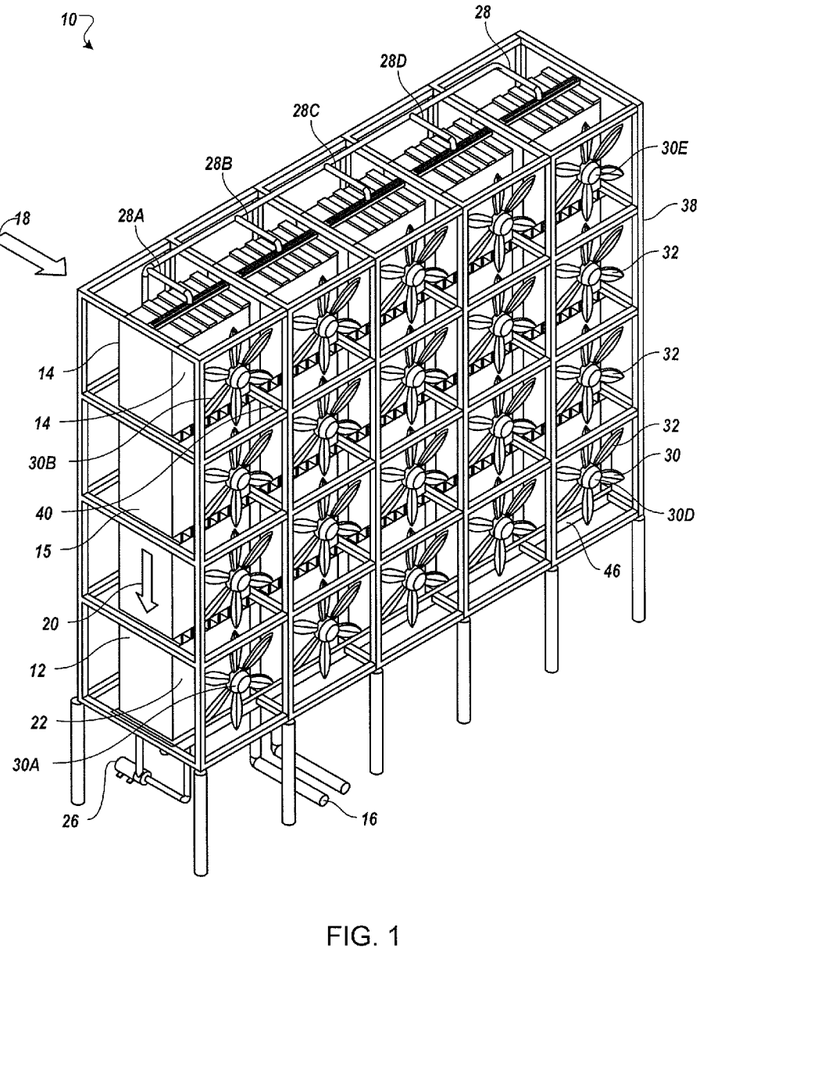
FIG. 1 is a perspective view of a vertical slab contactor.

The carbon capture facility can be built up in modules, such as for example illustrated in FIG. 1. As an example, each module can have dimensions of about 5 m by about 5 m by bout 7 m. The modules contain packing and can support a fan. Once the modules are assembled to form the carbon capture facility, the packing material can ultimately occupy dimensions of about 200 m by about 20 m by about 3 m. The modules can be built from steel. The final structure can include a sump at the base which has fluid. A pump is configured to periodically moe the fluid from the supm to a distributor at the top of the packing. The gas phase is moved through the packing by the wind, fans, or a combination thereof. In the illustrated embodiment, each module supports a fan, resulting in a wall of fans.

"Packing" is a material that fills a space and facilitates the contact between a gas stream and a liquid stream. Packing can be random or structured. Random packing comprises small shapes formed out of a suitable material and dumped into the space where contact between liquid and gas is to occur. Structured packing is any packing which is designed to be fitted into an area in a systematic and planned manner that results in a specific flow pattern for both air and liquid.

In some embodiments, packing suitable for use within the scope of the disclosure has: a cross flow geometry designed to limit or minimize the pressure drop in air per unit CO2 extracted; can be efficiently wetted by intermittent liquid flows; and, has a liquid hold up enabling intermittent operation with long time durations between wetting.

In some embodiments, packing suitable for use within the scope of the disclosure can tolerate manufacturing flaws, i.e. even significant portions of the packing material are not wetting. For purposes of this disclosure, in this context, "significant" means beyond the valued normally considered acceptable for structured packing. In some embodiments, packing suitable for use within the scope of the disclosure can include flaws or dead spots which are not wetted, as long as such dead spots do not significantly increase drag per unit $CO_2$ captured, or in other words the effect of the dead spots would not impact the overall cost per ton of $CO_2$ captured when both capital and operating costs are considered to an extent that would deter use of the packing material. In some embodiments, the effect of the dead spots would not increase the overall cost per ton of $CO_2$ captured when both capital and operating costs are considered. In some embodiments, packing suitable for use within the scope of the disclosure includes up to about 10% dead spots or flaws. The use of packing with flaws or gas parts may reduce capital cost of the packing.

In some embodiments, packing material suitable for use in accordance with the disclosure is readily cleaned of airborne contaminants. In some embodiments, cleaning should take advantage of intermittent flow.

In some embodiments, packing suitable for use in carbon capture facilities within the scope of the disclosure are designed for liquid hold up, have a low resistance to the gas flow (e.g. about 100 Pa at gas flows of 2 m/s or less), and/or can be flushed by intermittent wetting.

In some embodiments, the packing material can be chosen from low-density commercial structured packing. Without being bound by theory, low density commercial structured packing, which is packing having a high void fraction, is thought to have a large area for the gas phase to pass through favorably impacting (i.e. reducing) the pressure drop across the packing relative packing with a lower void fraction. A reduction in pressure drop is thought to lead to a decrease in the amount of energy consumed when moving the gas phase through the packing Non-limiting examples of suitable packing materials include Bretwood AccuPak CF-1200, Brentwood XF74, Sulzer 250X, Sulzer I-ring, Montz-Pak type M.

A "vertical slab" refers to a layout of packing in which the dimension parallel to gas flow is smaller than the dimensions perpendicular to the gas flow. For example, in some embodiments, the thickness of the vertical slab (which is dimension parallel to the air flow) is about 3 m, whereas the other two dimensions are about 200 m (length) and 20 m (height).

The liquid, or $CO_2$ capture solution, which is used with the carbon capture facility, can be any liquid that can remove at least some $CO_2$ from ambient air. In some embodiments, a basic solution is used. In some embodiments, a KOH or a NaOH solution is used. In some embodiments, the KOH solution has a molarity ranging from less than 1 molar to about 6 molar. In some embodiments, the NaOH solution has a molarity ranging from less than 1 molar to about 6 molar. The molarity of the solution can be chosen based on a number of factors, including location, packing structure, operating conditions, equipment and value of $CO_2$ captured. In general, the liquid is chosen to have a sufficient capacity to absorb $CO_2$ per unit volume to enable intermittent flow or wetting of the packing material.

Prior to this disclosure, it was believed that a packed tower, counterflow geometry should be used for ambient carbon dioxide capture. See, e.g., H. Herzog, "Assessing the Feasibility of Capturing $CO_2$ from the Air" (MIT Laboratory for Energy and the Environment, 2003). Contrary to the conventional wisdom, it has been shown that in some embodiments, the carbon capture facilities provide an improvement in one or more of operating costs, capital costs, and pressure drops (anywhere other than at the packing) relative to conventional ambient air carbon capture facilities comprising a packing material but having a cylindrical, tower geometry using a counterflow design, specifically the tower geometry carbon capture facility described in In some embodiments, operating costs are improved by improving energy extraction from ambient wind to reduce energy use, for example by orienting the contactor to get the most energy from the wind, wherein the orientation is a function of wind directions and air handling equipment. In some embodiments, the slab is oriented so that the direction of the prevailing wind is not parallel to the direction of flow of the carbon capture solution through the packing material (i.e. the direction of the prevailing wind is not parallel to the orientation of the slab). In some embodiments, improved energy extraction from ambient air is accomplished using a crossflow design. In some embodiments, the direction of the prevailing winds relative the orientation of the slab ranges from about 80 degrees to about 100 degrees. In general, the orientation would be chosen to minimize the annual average fan power depending on the wind rose and local geography. In some embodiments, the direction of the prevailing winds relative to the orientation of the slab is about 90 degrees.

In some embodiments, operating costs are improved by intermittently wetting, rather than continuously dripping, the packing material with carbon capture liquid. In some embodiments, the carbon capture liquid is pulsed having a duration sufficient to wash the somewhat spent solution which is capturing CO2 at a reduced rate off the packing and replace it with fresh solution that will capture CO2 at a faster rate. In some embodiments, the time between pulses is chosen to reduce or minimize the cost of CO2 capture, taking into account both the energy required to operate the system and the cost of capital used to build the system. In some embodiments, in which the packing has in inlet surface area for the gas of about 200 m×20 m and a thickness of about 3 m, the duration of a pulse can range from about 30 to about 60 seconds and the time between pulses can range from about 1 to about 20 minutes. In some embodiments, the duration of a pulse can range from about 60 to about 200 seconds and the time between pulses can range from about 1 to about 20 minutes. In some embodiments, the pump would be on for 150 seconds and off for 240 seconds In some embodiments, capital costs are reduced by reducing the footprint and total structure size per unit of capacity.

Low energy contactor for CO2 capture from air. Some embodiments disclosed in this document link three concepts:
1. That low-density commercial structured packings combined with high-molarity caustic solutions exhibit sufficiently low pressure drops to make them cost effective for air capture.
2. When used with high-molarity caustic solutions such packings may be operated using intermittent fluid flow. High fluid flows (i.e. fluid flows matching the specifications provided by the manufacturer) can be used to wet the surface which then exhibits sufficient 'hold up' to enable it to capture CO2 from air for 100's of seconds with minimal loss of capture efficiency. This operation mode can improve the overall energy efficiency by factors of three or more as compared to conventional counterflow tower geometries because the fluid pumping work is essentially eliminated. In some embodiments, "minimal loss of capture efficiency" can be demonstrated by an uptake rate decrease of less than 30% in a time span of minutes. Packing manufacturers claim that if the solution flow drops below a certain threshold (different for each type of packing) the contact between the solution and the gas will drastically drop with the result in many situations of the uptake rate dropping by a factor of 10 up to a factor of 100. However, in embodiments in accordance with the disclosure, packing can be wetted using the flows suggested by the manufacturer's specifications but then the flow can be shut off and the uptake rate decreases by less than 30% in a time span of minutes.

3. Configurations of large-scale contactors that have high ratios of packing area to total footprint and that interact with the ambient air so as to minimize or reduce recycling of low-CO2 air into the contactor inlet. If a rectangular array of conventional packed towers were built then the air exiting one unit which has a lower than ambient concentration of $CO_2$ would be sucked into the toward downwind of it. This tower would then experience a reduced $CO_2$ capture rate but it would still be costing as much to run it as the first tower. In any array of standard packed towers (other than a line of them) this would affect a large portion of the towers and decrease the overall facilities capture of $CO_2$ with no change in operating costs. If the cost to own and run the system is constant but the capture rate drops then the cost per captured $CO_2$ increases. Slab' contactor geometries will have much lower capital costs per unit of air scrubbing capacity than could be achieved with conventional 'tower' geometries.

Figure 6:
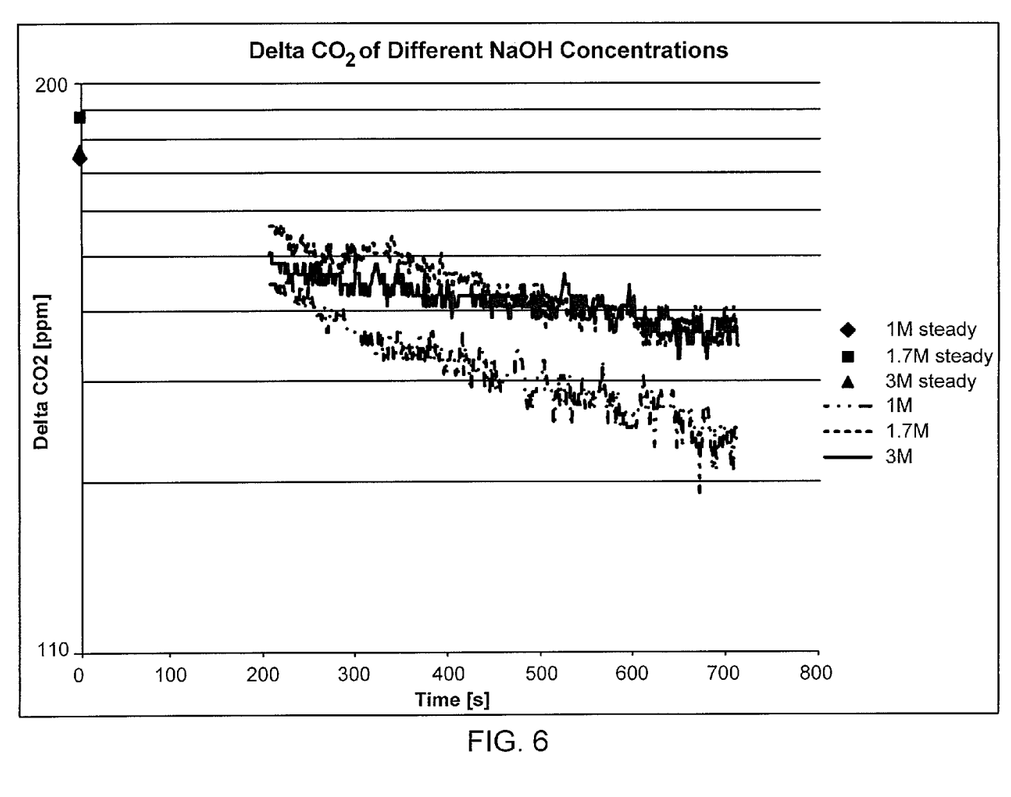
FIGS. 6 and 7 are graphs that illustrate the $CO_2$ removal from air passed through packing structured according to embodiments disclosed herein and pumped with liquid absorbent at different NaOH (FIG. 6) and KOH (FIG. 7) concentrations. Continuous flow is indicated by the dots on the y axis, while capture efficiency after a single pulse of flow is illustrated by the plotted lines.
Figure 7:
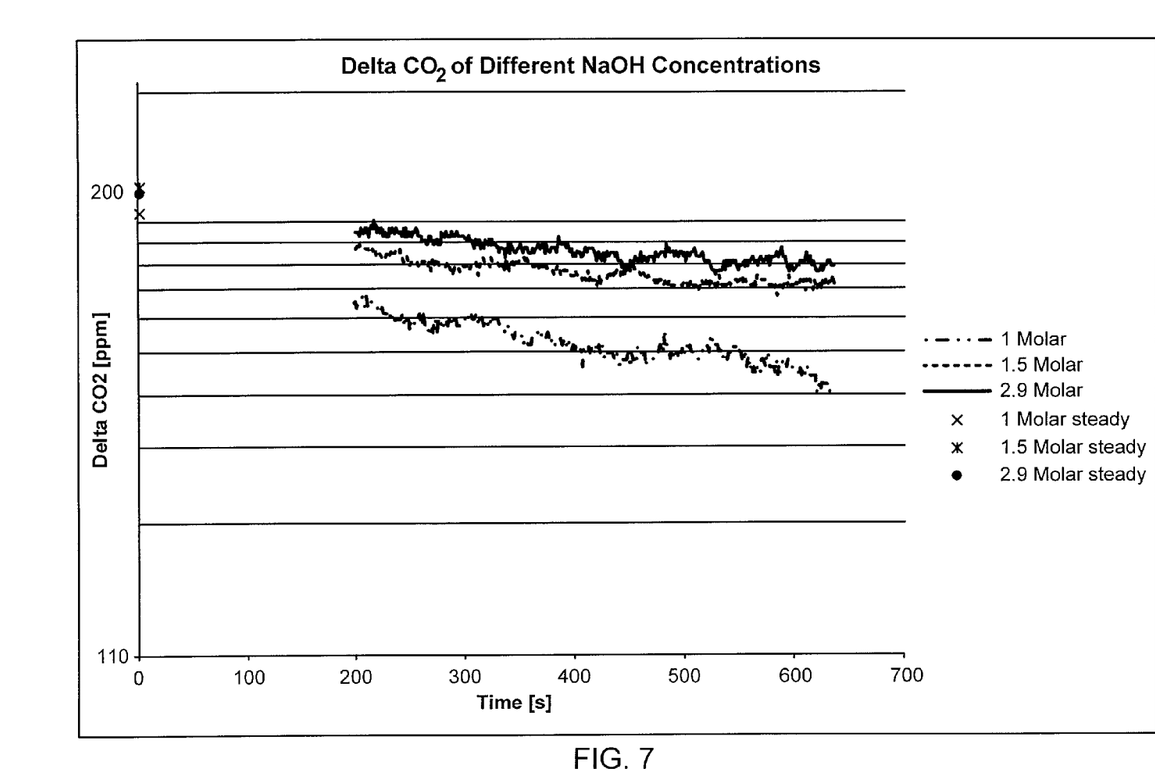
Figure 8:
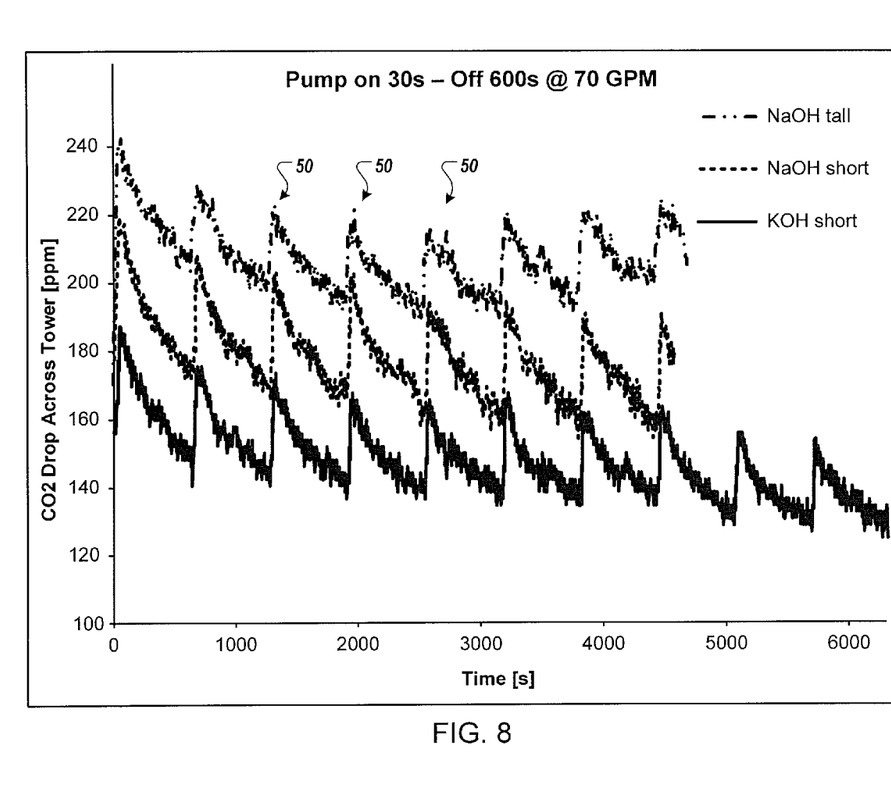
FIG. 8 is a graph that illustrates the effectiveness of pulsed pumping of the liquid absorbent through the packing, by illustrating the $CO_2$ removal per pulse at different NaOH concentrations.

Referring to FIGS. 6-8, there is provided laboratory data that demonstrates the first two ideas. This data illustrates that commercial structured packing (e.g., Sultzer 250 X) can be operated with high molarity NaOH or KOH, for example, flowing in pulses that amount to less than, for example, 10% of full time (for example operating at the design fluid flow rate for about 30 seconds and then no fluid flow for about 600 seconds) while achieving >80% of the capture rate achieved with the design fluid flow rates. The data would enable one to choose the optimal cycle time for specific contacting fluids and packing, and will provide a basis for improving packing designs for this application.

Figure 2:
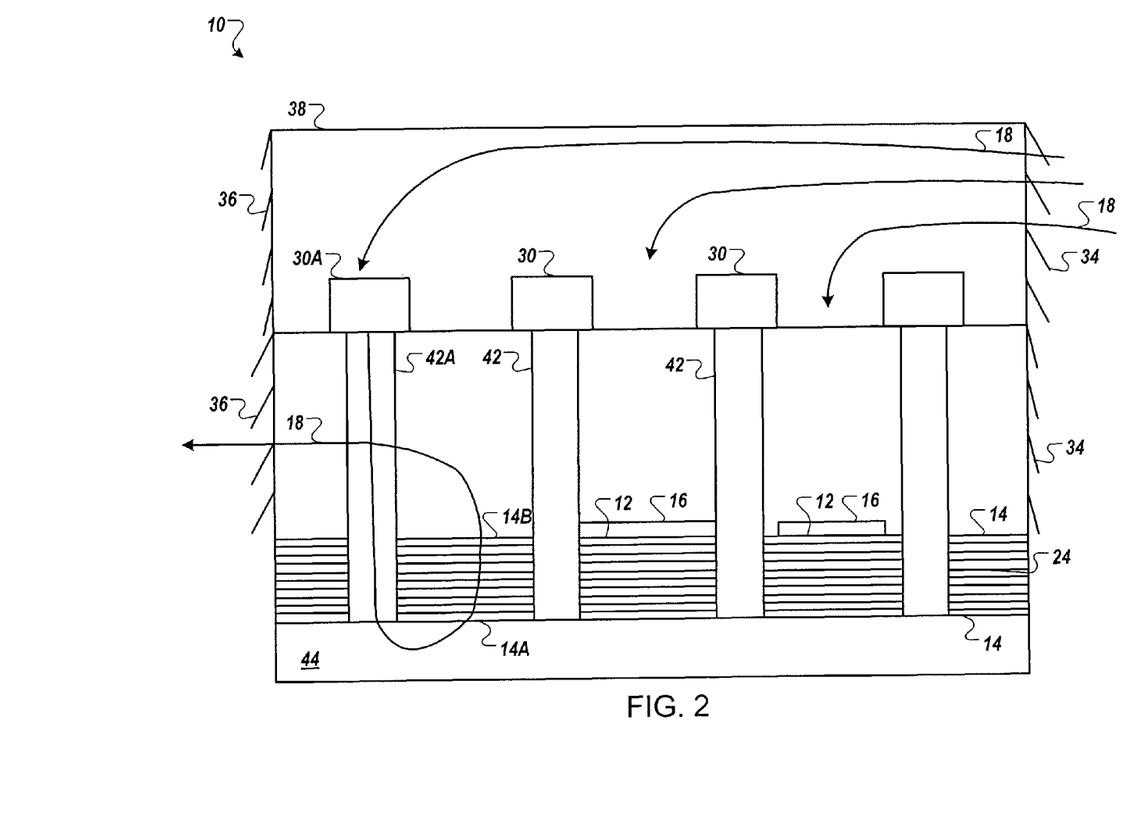
FIG. 2 is a side elevation view, in section, of a horizontal slab contactor.
Figure 3:
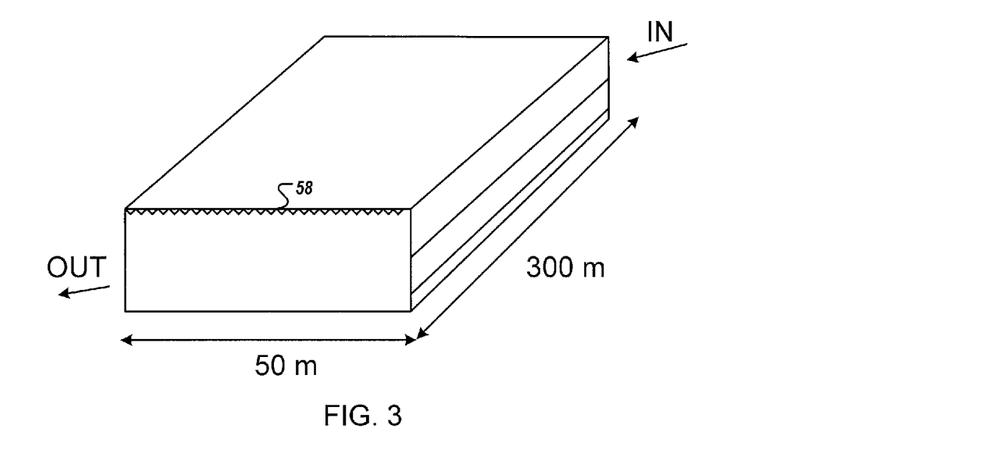
FIG. 3 is a perspective view of the contactor of FIG. 2.
Figure 5:
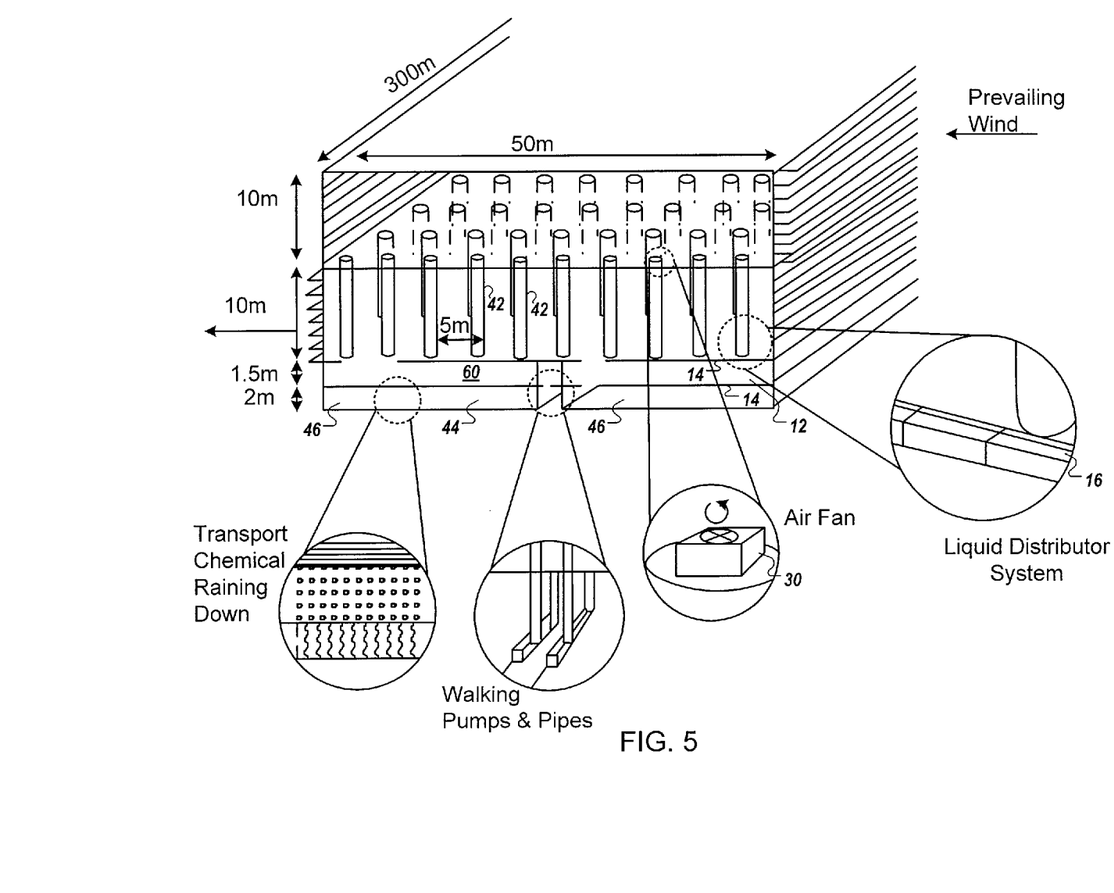
FIG. 5 is a perspective view, including a series of exploded views thereof, of a horizontal slab contactor, partially in section.

Referring to FIGS. 6-8, disclosed is data on the performance of both NaOH and KOH solutions at a wide range of concentrations in using both continuous and intermittent flow. For any of the embodiments illustrated herein, the total mechanical work requirement may be less than 100 kWhr/t-CO2 at capture rates greater than 20 t-CO2/m2-yr. Whereas vertical slab geometry is emphasized in portions of this disclosure, disclosed as embodiments herein are two slab-geometry contactors: Vertical slab geometry (FIG. 1), and horizontal slab geometry (FIGS. 2, 3, and 5). It should be understood that the disclosed embodiments are provided for the purpose of illustration and should not be construed as limiting in any way.

Referring to FIG. 1, a carbon dioxide capture facility 10 is illustrated comprising packing 12 formed as a slab 15, the slab 15 having opposed dominant faces 14, the opposed dominant faces 14 being at least partially wind penetrable to allow wind to flow through the packing 12. At least one liquid source 16 is oriented to direct carbon dioxide absorbent liquid into the packing 12 to flow through the slab 15. The slab 15 is disposed in a wind flow 18 that has a non-zero incident angle with one of the opposed dominant faces 14. The packing 12 may be oriented to direct the flow of carbon dioxide absorbent liquid through the slab 15 in a mean flow direction 20 that is parallel to a plane 22 defined by the opposed dominant faces 14. It should be understood that opposed dominant faces 14 don't have to be exactly parallel. In one embodiment, the faces 14 may be converging, diverging, or curved for example. Packing 12 may be oriented to allow the carbon dioxide liquid absorbent to flow through the packing 12 by gravity, as illustrated. In some embodiments, packing dimensions can be about 200 m×about 20 m by about 3 m contained in a structure measuring about 200 m×25 m×7 m. In some embodiments, dimensions can range from about 10 m×about 7 m×about 2 m to about 1000 m×about 50 m×about 15 m.

Referring to FIG. 1, the non-zero incident angle refers to the fact that wind flow 18 strikes the face 14 at an angle greater than zero. This may be contrasted with traditional packing arrangements, where gas is flowed through a tower of packing starting from the very bottom. In some embodiments, the non-zero incident angle is orthogonal with the one of the opposed dominant faces. It should be understood that the non-zero incident angle may be within 10% of exactly orthogonal. The non-zero incident angle may also refer to the mean angle of flow of the wind. The mean angle of flow of the wind may be averaged over a period of time.

Referring to FIG. 2, in some embodiments, the packing 12 further comprises structured packing The packing 12 may be, for example, 1-2 meters thick between the opposed dominant faces 14. In other embodiments, the packing 12 may be thicker or thinner. The term structured packing may refer to a range of specially designed materials for use in absorption and distillation columns and chemical reactors. Structured packings typically consist of thin corrugated material 24, such as metal plates or gauzes arranged in a way that they force fluids to take complicated paths through the column, thereby creating a large face area for contact between different phases. Structured packings may be made out of corrugated sheets arranged in a crisscrossing relationship to create flow channels for the vapor phase. The intersections of the corrugated sheets create mixing points for the liquid and vapor phases. Wall wipers are utilized to prevent liquid and/or vapor bypassing along the column wall. Rotating each structured packing layer about the column axis provides cross mixing and spreading of the vapor and liquid streams in all directions.

Figure 9:
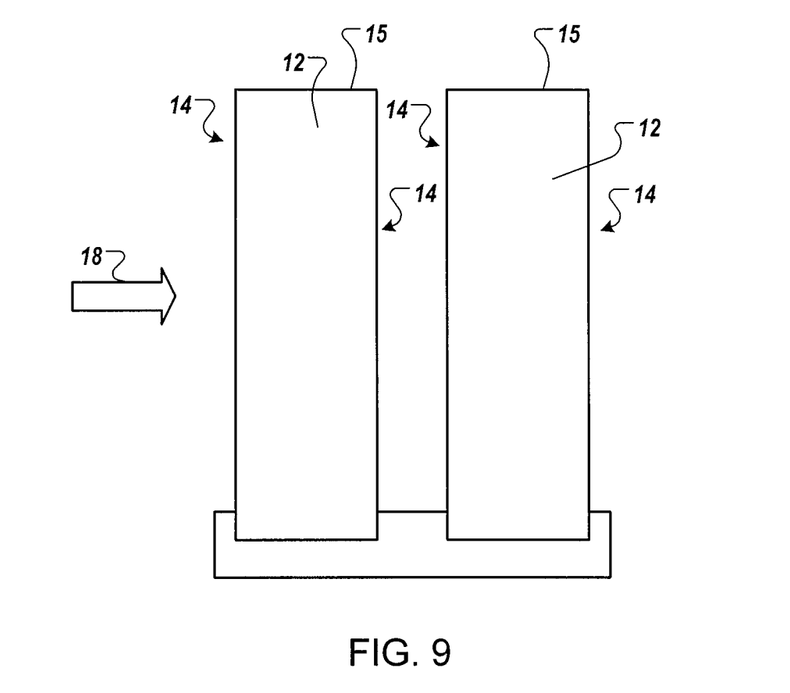
FIG. 9 is a side elevation view of a vertical slab contactor with plural slabs.

Referring to FIG. 1, the opposed dominant faces 14 may be oriented vertical. The orientation of faces 14 may be determined relative to, for example, the ground. In other embodiments, faces 14 may be oriented at an angle to the ground, ie slanted. Referring to FIG. 5, the opposed dominant faces 14 may be oriented horizontal. This embodiment tends to have a larger footprint than the vertical slab embodiment. Referring to FIG. 9 the packing 12 is formed as plural slabs 15. Plural slabs may also be, for example, by plural slabs arranged end-to-end, as opposed to the stacked orientation illustrated in FIG. 9. In some embodiments, the slab might be vertically sectionalized, effectively providing plural slabs end to end on top of one another. This may be required in order to get sufficiently good distribution of liquid in such a narrow aspect ratio (e.g., 20 m high by 1.5 wide). Between the vertical sections there may be a collector/distributor system that collects fluid flowing from above and redistributes it evenly to the packing slab below. In some embodiments, such a collector/distributor system may be present in any slab as disclosed herein.

Referring to FIG. 1, the at least one liquid source 16 may further comprise at least one pump 26. Pump 26 may have several distribution pipes 28, controlled by a valve (not shown), in order to selectively apply liquid into various sections of packing 12. The at least one pump 26 may be configured to supply the carbon dioxide absorbent liquid in a series of pulses.

Referring to FIG. 1, at least one fan 30 may be oriented to influence wind flow through at least a section of one of the opposed dominant faces 14 of the packing 12. Fan 30 may be reversible. In some embodiments, fan 30 may prevent the wind flow that has already flowed through the packing 12 from circulating back into the packing 12. Referring to FIG. 5, in some embodiments, at least one fan 30 may drive the wind flow into packing 12. Referring to FIG. 1, the at least one fan 30 may further comprise plural fans, each of the plural fans being oriented to influence wind flow through at least a respective portion of the packing 12. In some embodiments, the respective portion is understood as being the portion of the packing 12 that air flow through fan 30 would have the greatest influence over, for example the packing 12 most adjacent or closest to fan 30. The at least one fan 30 may provided as part of a fan wall 32 adjacent at least one of the opposed dominant faces 14. It should be understood that fan walls (not shown) may be located adjacent each of faces 14. Adjacent, in this document, is understood to mean next to, and can include embodiments (such as the one illustrated in the Figures) where the fan wall 32 is spaced from, but adjacent to, face 14. Referring to FIG. 1, the fan wall 32 may be adjacent the one of the opposed dominant faces 14 through which the wind flow 18 is exiting the packing 12. In fan wall 32, the individual fans may be separated by impermeable material. The fans 30 create a pressure drop across the wall 32, which drives flow through the packing 12. In some embodiments, fan wall 32 is designed such that, in the event that a fan fails, and ultimately blocks of its respective flow, flow through the packing 12 would be almost, if not completely, unaffected. This may be accomplished by closely spacing adjacent fans, and by spacing the fan wall 32 from the packing 12, for example.

Referring to FIG. 2, facility 10 may further comprise wind guides 34 oriented to direct the flow of wind 18 into the packing 12. Facility 10 may further comprise wind guides 36 oriented to direct the flow of wind 18 out of the packing 12. Wind guides 34 and 36 may be, for example, louvers. As illustrated in FIG. 2, the wind guides 34 and 36 may be independently controllable. In the embodiment of FIG. 2, wind flow 18 is directed from the right to the left. Thus, the upper wind guides 34 are open, with the lower wind guides 34 closed. Similarly, upper wind guides 36 are closed, while lower wind guides 36 are open. Thus, wind flow 18 has a net flow from upper wind guides 24 to lower wind guides 36, passing through packing 12 in the process. Referring to FIG. 2, facility 10 may be part of an at least partially enclosed structure 38. Because of the nature of the embodiments disclosed herein, that being that they may involve the processing of great deals of wind, it may be important to shield facility 10 from the elements, including animals and insects. Wind guides 36 and 34 may aid in this, along with a surrounding structure adapted to selectively let in and process wind flow. In some embodiments, a protective covering (not shown) may be provided over packing 12 to prevent animal intrusion but allow wind flow to pass through. Referring to FIG. 1, a cleaning device 40 for cleaning the walls of the at least partially enclosed structure 38 may be provided. Cleaning device 40 may be, as illustrated for example, a wiper that rotates about an axis to clean the exterior of fan wall 32, for example. Wind guides 34 and 36 may be horizontally oriented, for example.

Referring to FIG. 2, facility 10 may further comprise at least one wind passage 42 extended through the opposed dominant faces 14 to deliver wind flow selectively to one of the opposed dominant faces 14. Referring to FIG. 2, wind passage 42 may have fan 30 attached to influence air flow through wind passage 42. Wind passage 42 allows wind to travel through faces 14, where it is released into basin 44, where the wind is free to pass into packing 12 through face 14A, exiting the packing 12 through face 14B. This way, wind flow may be induced to flow through the horizontal faces 14 of a horizontal slab of packing 12. Wind passages 42 may be, for example, air ducts that are 10 m in height. In the embodiment illustrated, wind passages 42 are vertical ducts in which $CO_2$ rich inlet air is moving down. These ducts may cover ~⅕ of the surface area (e.g., ~1.2 m diameter tube arranged in a grid with 5 meter spacings.).

Figure 4:
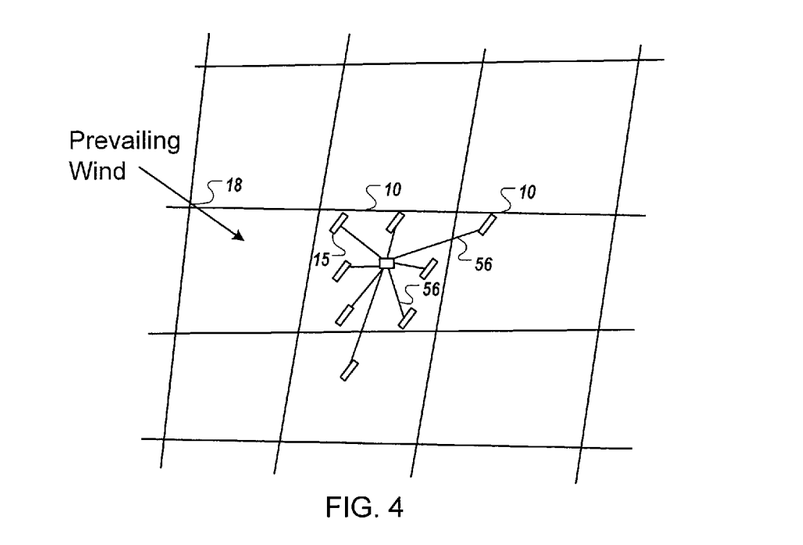
FIG. 4 is a top-down view of a series of carbon-dioxide capture facilities with a central processing facility.

Referring to FIG. 1, a sink 46 may be provided for collecting carbon dioxide absorbent liquid that has flowed through the packing 12. Referring to FIG. 2, the sink is illustrated as basin 44. Basin 44 may be, for example a concrete-lined basin that catches the hydroxide and contains supports to hold the packing Referring to FIG. 5, there may be a gap 60 as illustrated between the packing 12 and the base 44 that can be ~1 to 1.5 m for example. In some embodiments (not shown), sink 46 may be a pipe or a series of conduits for example, that transport the liquid directly from packing 12. This type of system may involve a funneling or drainage apparatus designed to focus the drainage of the liquid into a single, or a network of pipes. The contacted liquid may then be recirculated through the packing, or it may be recycled and then recirculated. Referring to FIG. 4, in some embodiments, facility 10 further comprises a recycling system 48 for regenerating spent carbon dioxide absorbent liquid. The recycling system may be, for example, any of the systems disclosed in Appendix A, which forms part of this specification, for recycling spent carbon dioxide liquid absorbent. As disclosed in Appendix A, the carbon dioxide absorbent liquid may comprise a hydroxide solution, for example a sodium hydroxide solution. The source of liquid 16 preferably supplies recycled carbon dioxide absorbent liquid.

Referring to FIGS. 1 and 2, a method of carbon dioxide capture is illustrated. Carbon dioxide absorbing liquid is applied into packing 12 in a series of pulses. Referring to FIG. 9, each pulse 50 may involve, for example, a short period during which the liquid is supplied into packing 12 by source of liquid 16. Each pulse doesn't have to be a sharp transient application, but can be a period of time during which liquid is being supplied. A gas containing carbon dioxide, for example air illustrated by flow of wind 18, is flowed through the packing 12 to at least partially absorb the carbon dioxide from the gas into the carbon dioxide absorbing liquid. Applying may further comprise pumping. Flowing may further comprise flowing the gas containing carbon dioxide through the packing at least when the carbon dioxide absorbing liquid is not being applied. Referring to FIG. 1, the flow of gas may be controlled using fans 30, for example. Referring to FIG. 2, the flow of gas may be controlled using fans 30 and wind guides 34 and 36. Referring to FIGS. 1 and 2, the flowing of the gas may be at least restricted when the carbon dioxide absorbing liquid is being applied. Referring to FIG. 1, this may be envisioned by the fans 30 of fan wall 32 ceasing to spin and draw the flow of wind through packing 12 when the pulse of liquid is being supplied to packing 12.

In some embodiments, the series of pulses has a duty cycle of 1-50%. In other embodiments, such as the one illustrated graphically in FIG. 9, the duty cycle may be 5% for example. The duty cycle refers to the ratio of the time duration of a pulse of applied liquid to the overall time duration of a cycle. For example, a 50% duty cycle implies the fluid is only flowing half the time the facility is operational. This means the pulse runs from 1 to 50% of the time the system is operational, and therefore a 1% duty cycle means that for every second that fluid is flowing is off for 99 seconds. In more realistic values, it is on for 30 seconds and off for 2970 seconds and a 50% duty cycle means the pump would run for 30 seconds and be off for the next 30 seconds. In some embodiments, the series of pulses has an off-time of 10-1000 seconds. In other embodiments, the series of pulses has an off-time of 100-10000 seconds.

Referring to FIG. 1, the step of applying may further comprise applying the carbon dioxide absorbing liquid into a first portion of the packing 12 in a first series of pulses, and applying the carbon dioxide absorbing liquid into a second portion of the packing 12 in a second series of pulses. This may be envisioned by selectively applying liquid via distribution tubes 28A and 28B to packing 12. Because tubes 28A and 28B only feed a portion (ie the left-most portion) of packing 12, only that portion will have liquid applied to it. Liquid may then be selectively applied to the right hand portion of packing 12 by applying liquid via tubes 28C and 28D. The first and second series of pulses may be synchronized, asynchronized, completely different, or synchronized out of phase with one another, for example, allowing fluids to be supplied intermittently from a continuously operating pump. In these embodiments, flowing the gas may further comprise at least restricting the flow of the gas containing carbon dioxide through the first portion of the packing when the carbon dioxide absorbing liquid is not being applied, and at least restricting the flow of the gas containing carbon dioxide through the second portion of the packing when the carbon dioxide absorbing liquid is not being applied. Thus, while the first portion has liquid being applied to it, for example the left hand portion of face 14 when liquid is being applied via tubes 28A and 28B, the flow of gas may be restricted or stopped altogether through the left hand portion of face 14. This may be accomplished by reducing, stopping, or even reversing fans 30A and 30B, for example. Similarly, while the second portion has liquid being applied to it, for example the right hand portion of face 14 when liquid is being applied via tubes 28C and 28D, the flow of gas may be restricted or stopped altogether through the right hand portion of face 14. This may be accomplished by reducing, stopping, or even reversing fans 30D and 30E, for example.

In some embodiments, the first series of pulses and the second series of pulses are staggered. Referring to FIG. 2, this may be advantageous, as when the left portion of face 14 has liquid being applied to it as described above, the right hand portion and center portions do not. Similarly, when the supply of liquid to the left hand portion is ceased, the source of liquid 16 may then apply liquid to the center or right hand portion, for example. This way, source of liquid 16 may cyclically feed liquid to the entire volume of packing 12 in a more efficient manner, instead of continuously feeding liquid to the entire volume of packing 12. Referring to FIG. 5, an example of this may be further envisioned, with a horizontal slab of packing 12. In this embodiment, the flow of wind through any of the various wind tubes 42 may be controlled, in order to achieve the same effect as that achieved above with the vertical slab embodiment. Referring to FIG. 2, an embodiment is illustrated where only one wind tube 42A has wind being driven down it. This may be achieved by the selective actuation of fan 30A, for example. Thus, the packing 12 that is nearest the outlet of wind tube 42A may have a flow of gas fed to it.

In some embodiments, the off-cycle of the series of pulses may be less than or equal to the time it takes for carbon dioxide absorbing liquid to stop draining from the packing after a pulse. It should be understood that this is not the time required for the entire pulse to be removed from the packing 12, since some liquid will always be left over as residue inside the packing 12. In other embodiments, the off-cycle of the series of pulses may be less than or equal to the time it takes for a pulse of carbon dioxide absorbing liquid to lose 70-80% of the pulses carbon dioxide absorption capacity.

Referring to FIG. 1, the packing may be oriented to flow the carbon dioxide absorbing liquid through the packing 12 in a mean liquid flow direction 20. Flowing may further comprise flowing the gas through the packing 12 obliquely or perpendicularly to the mean liquid flow direction 20. As disclosed above, this is advantageous as the flow of gas my have a different flow direction than, and one that is not counter current to, the mean liquid flow direction 20 of the liquid. Thus, a larger surface area of the packing may be used to full advantage, greatly increasing the quantity of wind or gas that may contact liquid in packing 12 over a course of time while still allowing the liquid to pass through and drain from packing 12. In these embodiments, a slab is not entirely necessary, in fact other shapes of packing 12 are envisioned, including but not limited to a cube, a cylindrical, and other various shapes. Referring to FIG. 1, in some embodiments flowing the gas further comprises flowing the gas through the packing 12 perpendicularly to the mean liquid flow direction 20. It should be understood that exact perpendicularity is not a requirement. Flowing may further comprise flowing the gas through at least one of the opposed dominant faces 14, for example through both of faces 14 as indicated.

As disclosed above, these methods may involve recycling the carbon dioxide absorbing liquid. Also as disclosed above, the methods may involve influencing the flowing of the gas through the packing. Influencing may comprise, for example, preventing the gas that has already flowed through the packing 12 from circulating back into the packing 12. Influencing may further comprise driving the flowing of the gas in a drive direction that is at least partially oriented with an ambient wind flow direction. This may be carried out using fans 30, which may be reversible in order to carry out this function. Further, these methods may involve directing the flow of gas at least one of into and out of the packing, using, for example louvers as already disclosed.

Referring to FIG. 1, in some embodiments, fans 30 may be reversible in order to enable the flow to be driven in the direction of the ambient wind field, which is more efficient than inducing a flow that is counter to the prevailing wind direction. Referring to FIG. 4, the orientation of slabs 15 may be such that prevailing wind 18 is perpendicular to the slab 15, and is in the direction at which the fan wall (not shown) works most efficiently. The packing design may use vertically oriented plates. This would be a modification of conventional structured packing designed to enable, for example, orthogonal liquid and gas flow directions. Packing may be for intermittent fluid flow so as to maximize the hold up of liquid absorbent inside the packing material. Referring to FIG. 1, as disclosed above, the fan wall 32 may be sectionalized, so that flow speed can be reduced or stopped when fluid is flowing to minimize fluid loss. The sections may be operated asynchronously so that only one section at a time is receiving the fluid flow enabling fluid pumps to operate continuously. For example, if fluid flow was needed for 100 seconds out of 1000 one may have 11 sections and would direct the fluid into one of them at a time.

Compared to the horizontal slab geometry, the vertical slab: minimizes the footprint and the total structure size per unit of capacity to reduce the capital cost, reduces peak velocity, improving efficiency, and enables the packing to be operated at higher peak velocities further reducing capital costs.

As disclosed above, some embodiments may invoke the use of louvers to enable the flow to be driven in the direction of the ambient wind without altering the operation of the fans. Referring to FIG. 5, the packing design may using coaxial flow or counter current flow, while still benefiting from the larger surface area of the slab to increase the amount of wind flow through the slab. The flow geometry allows one to get even flow though a large horizontal slab mounted just above a fluid reservoir while maintaining air speeds below about 5 msec. The air speed constraint determines the ratio of the structures height to its width. Specifically, height/width is approximately equal to airspeed-at-packing/air-speed-at-exit. Compared to the vertical slab geometry, the horizontal slab has a larger footprint, and may have higher costs, but it has the advantage that it may use more conventional packing and fluid distribution.

Referring to FIG. 4, a rough sketch is illustrated showing a mile X mile grid (eg. roads on a North American prairie) with 8 capture units each having, for example, 300×50 m footprint facilities 10 and a central processing station 48 with connecting pipelines 56. A system of this magnitude would be expected to capture 1-5 megatons $CO_2$ per year.

Referring to FIG. 3, a view of a full unit, for example 50 m wide, by 300 long, by 20 m high is illustrated. In some embodiments, the height of the slabs may be 10-30 m. If the wind was blowing from the right to left, one would open the louvers so that inlet air flowed in on the lower right and out the upper left. (This is the opposite of what is shown in the cross section illustrated in FIG. 2). The roof 58 may be rough, like the zig-zag design shown here which is structurally efficient. In some embodiments, the roof 58 need not keep water out, it need only be proof against wind loads. Referring to FIG. 5, the source of liquid may be, for example a fluid distribution system on top of packing 12.

Referring to FIG. 1, another method of carbon dioxide capture is illustrated. Carbon dioxide absorbing liquid is flowed through packing 12 in a mean liquid flow direction 20, a gas containing carbon dioxide is flowed through the packing 12 obliquely or perpendicularly to the mean liquid flow direction 20 to at least partially absorb the carbon dioxide from the gas into the carbon dioxide absorbing liquid. Flowing carbon dioxide absorbing liquid through packing 12 may further comprise applying the carbon dioxide absorbing liquid into the packing 12 in a series of pulses. The series of pulses has been disclosed in detail throughout this document, and need not be built upon here. As disclosed above, flowing the gas further may comprise flowing the gas through the packing 12 perpendicularly to the mean liquid flow direction 20.

A method of contacting a liquid with a gas is also disclosed comprising applying the liquid into packing 12 in a series of pulses and flowing the gas through the packing 12. Referring to FIG. 8, after the pulse 50 has been applied, the downward slope of each of the profiles indicates that $CO_2$ is still being absorbed by the slowly draining or stagnant liquid. This illustrates that this packing 12 design is highly efficient, because it continues to effectively contact gas and liquid, without the need for constant pumping. Referring to FIGS. 6 and 7, the capture efficiency of $CO_2$ is illustrated and contrasted for continuous flow (indicated by the dots on the y axis), and for a single pulse of flow (illustrated by the plotted lines). The time scale is time after the flow has been shut off for the pulsed flow. The downward sloping lines show the gradual drop off in capture efficiency over 200-1000 seconds, but illustrate that the liquid still has a high capture efficiency, even after hundreds of seconds have passed. While this method is also envisioned for some of the embodiments herein, it is not as efficient as the pulsed method, as it requires far greater pumping action. Thus, the pulsed method may be applied to any gas-liquid contactor, because it has been proven herein to afford sufficient gas-liquid contact despite a lack of continuous pumping. An exemplary application of this may be provided as a scrubbing unit at a refinery, for example. It should be understood that the gas-liquid contactor may have all of the same characteristics as the carbon dioxide capture facility as disclosed herein.

Further disclosed is a method of contacting a liquid with a gas comprising flowing the liquid through packing in a mean liquid flow direction, and flowing the gas through the packing obliquely or perpendicularly to the mean liquid flow direction. This method may be envisioned as carried out by the embodiments in the figures. Similar to the gas-liquid contactor, the results from FIGS. 6-8 confirm that this method may be applied to any gas-liquid contact system. By having the gas flowed through the packing at an angle, the structure of such a contactor employing this method would be greatly simplified, since the gas inlet and outlet will be at different locations in the packing then the liquid source and sink. This is in contrast to previous systems which supply gas in a counter-current direction to the liquid flow. It should be understood that this method may have all of the same characteristics as the carbon dioxide capture methods disclosed herein. For example, flowing the liquid through the packing may further comprise applying the liquid into the packing in a series of pulses. Furthermore, flowing the gas may further comprise flowing the gas through the packing perpendicularly to the mean liquid flow direction.

Referring to FIG. 1, a gas-liquid contactor (illustrated by facility 10) is also disclosed. Referring to FIG. 1, the contactor (illustrated as facility 10) comprises packing 12 formed as a slab 15, the slab 15 having opposed dominant faces 14, the opposed dominant faces 14 being at least partially wind penetrable to allow wind to flow through the packing 12. At least one liquid source 16 is oriented to direct the liquid into the packing 12 to flow through the slab 15. The slab is disposed in a wind flow 18 that has a non-zero incident angle with one of the opposed dominant faces 14. Similar to the gas-liquid contactor and the above described method, the results from FIGS. 6-8 confirm that this method may be applied to any gas-liquid contactor. It should be understood that this gas-liquid contactor may have all of the same characteristics as the carbon dioxide capture facility and contactor disclosed herein.

Referring to FIG. 1, a gas-liquid contactor (illustrated by facility 10) is also disclosed, comprising a slab 15 structure comprising packing 12 and a liquid source 16 oriented to direct the liquid into the packing 12 to flow in a mean liquid flow direction 20. The slab structure is disposed in a wind flow 18 that flows obliquely or perpendicularly to the mean liquid flow direction 20. Similar to the gas-liquid contactor and the above described methods, the results from FIGS. 6-8 confirm that this method may be applied to any gas-liquid contactor. It should be understood that this gas-liquid contactor may have all of the same characteristics as the carbon dioxide capture facility and contactor disclosed herein.

Referring to FIG. 1, a method of contacting a liquid with a moving gas (illustrated as wind flow 18) is disclosed. The method comprises flowing the liquid through packing 12, and driving the moving gas through the packing 12 in a drive direction (illustrated as 18B, which is the same as wind direction 18 in this embodiment) that is at least partially oriented with an ambient flow direction 18 of the moving gas. In the embodiment shown, the flowing gas is wind, and the ambient flow direction is the ambient wind direction 18. This method may further comprise reversing the drive direction 18B when the ambient flow direction 18 reverses. Reversing the fan direction (or more generally, reversing the forced flow of air through the packing) in such a way as to drive the air with a vector direction that is at least partially oriented with the ambient wind 18 reduces the required fan power. Further, this reduces the amount of low-$CO_2$ air that is recycled back into the inlet of the system, thus improving its efficiency. It is thus advantageous to align the packing such that one of opposed dominant face 14 is roughly perpendicular to the prevailing wind, in order to maximize the efficiency of the fans.

In this document, wind flow is understood as moving gas containing $CO_2$.

Generating Carbon Credits

The carbon that is sequestered from a gas comprising carbon dioxide using the methods described herein can be equated with, for example, an environmental credit such as a carbon credit. Carbon credits are used to provide an incentive to reduce greenhouse gas emissions by capping total annual emissions and letting the market assign a monetary value to a tradable unit. As used herein, carbon credits include carbon credits as defined by provisions in place at the time of filing but are not limited to such. Carbon credits also refer to any type of tangible or intangible currency, stocks, bonds, notes or other tradable or marketable unit used to value an amount of carbon sequestered, an amount of greenhouse gas emissions reduced, or any other type of carbon-neutral or carbon-negative activities. A similar concept of environmental credits can be applied, for example, for the implementation of best practices related to environmental land practices.

Carbon credits can be obtained, for example, by applying and receiving certification for the amount of carbon emissions reduced (e.g., the amount of carbon sequestered, the amount of CO2 and other greenhouse gases not released into the atmosphere). The quality of the credits can be based in part on validation processes and the sophistication of funds or development companies that act as sponsors to carbon projects. See, for example, U.S. Patent Publication Nos. 2002/0173979 and 2007/0073604 for representative methods for verifying and valuing carbon credits. Carbon credits can be exchanged between businesses or bought and sold in national or international markets at a prevailing market price. In addition, companies can sell carbon credits to commercial and individual customers who are interested in voluntarily offsetting their carbon footprints. These companies may, for example, purchase the credits from an investment fund or a carbon development company that has aggregated the credits from individual projects.

The process of applying for, obtaining and/or validating one or more carbon credits may or may not include taking actual measurements. Simply by way of example, each transfer of carbon credits within Europe is validated by the ETS, and each international transfer is validated by the United Nations Framework Convention on Climate Change (UN-FCCC).

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

The Embodiments of the Invention in which an Exclusive Property or Privilege is claimed are defined as follows:

1. A method for removing carbon dioxide from ambient air with a carbon dioxide capture facility, comprising:
    providing a liquid having a capacity to absorb carbon dioxide;
    providing a packing material comprising a plurality of flow passages;
    positioning the packing material such that ambient air flows in a direction from a first opposed dominant face through the plurality of flow passages to a second opposed dominant face opposite the first dominant face;
    positioning a fan to influence flow of the ambient air through at least a section of one of the first or second opposed dominant faces of the packing material, the packing material having a dimension between the first and second opposed dominant faces that is parallel to the flow of the ambient air between about 1 meter and about 15 meters;
    circulating, with the fan, the ambient air comprising atmospheric carbon dioxide through the plurality of flow passages of the packing material;
    applying, with a pump, the liquid over the packing material at a first flow rate of the liquid during a first portion of a time duration, the first portion comprising a sufficient time duration to substantially replace a previous portion of the liquid on the packing with a new portion of the liquid that has a greater carbon dioxide absorption rate than the previous portion of the liquid;
    applying, with the pump, the liquid over the packing material at a second flow rate of the liquid applied during a second portion of the time duration; and
    absorbing at least a portion of the atmospheric carbon dioxide with the liquid at a predetermined duty cycle based on the time duration.

2. The method of claim 1, further comprising:
    positioning the packing material such that the flow of the liquid through the packing material is in a mean flow direction that is parallel to a plane defined by the first and second opposed dominant faces.

3. The method of claim 2, wherein positioning the packing material such that the flow of the liquid through the packing material is in a mean flow direction that is parallel to a plane defined by the first and second opposed dominant faces comprises:
    positioning the packing material to allow the liquid to flow through the packing material by gravity.

4. The method of claim 2, further comprising:
    positioning the packing material such that the first and second opposed dominant faces are vertically oriented.

5. The method of claim 1, wherein the dimension ranges from about 1 meter to about 3 meters.

6. The method of claim 1, further comprising:
    selectively controlling a speed or a direction of the fan based on a direction of wind incident on the packing material.

7. The method of claim 6, wherein the fan comprises a part of a fan wall adjacent at least one of the first or second opposed dominant faces of the packing material.

8. The method of claim 1, further comprising:
    connectively positioning a plurality of modular structures containing the packing material in the carbon dioxide capture facility.

9. The method of claim 8, wherein each modular structure comprises dimensions of about 5 meters by about 5 meters by about 7 meters, the method further comprising:
   interconnecting the plurality of modular structures to result in a carbon dioxide capture facility in which the packing material occupies a space having dimensions of about 200 meters by about 20 meters by about 3 meters.

10. The method of claim 1, wherein the liquid comprises a hydroxide solution.

11. The method of claim 10, wherein the hydroxide solution comprises a sodium hydroxide solution.

12. The method of claim 1, wherein the second flow rate is substantially zero.

13. The method of claim 1, wherein the predetermined duty cycle is between 1-50% such that the first portion of the time duration is between about 1% of the time duration and about 50% of the time duration.

14. The method of claim 1, further comprising
   positioning the fan to influence flow of the ambient air through at least a portion of the packing material during the second portion of the time duration.

15. The method of claim 1, wherein the liquid and the packing material are configured to cooperatively achieve a liquid holdup that provides an increased carbon dioxide capture rate relative to the carbon dioxide capture facility operating with the pump constantly at a flow rate substantially equal to an average flow rate of the first and second flow rates.

16. The method of claim 1, wherein the first and second portions of the time duration are distinct in value.

17. The method of claim 1, further comprising circulating, with the pump, the liquid through a liquid distributor system and to the packing material.

18. The method of claim 1, wherein the packing material comprises structured packing.

* * * * *